Nov. 2, 1926. 1,605,350

G. KLISCH

DUST GUARD FOR MOTOR CARS

Filed Feb. 19, 1926

Witnesses:

Inventor:
Gustav Klisch

Patented Nov. 2, 1926.

1,605,350

UNITED STATES PATENT OFFICE.

GUSTAV KLISCH, OF HALBERSTADT, GERMANY.

DUST GUARD FOR MOTOR CARS.

Application filed February 19, 1926, Serial No. 89,391, and in Germany February 16, 1925.

This invention relates to an improved dust guard for motor cars, which comprises turnable two-parted suction funnels, of which one part is movable and provided with a ball head that is turnable in a corresponding ball cup of the other stationary part and provided with an opening for the suction conduit in such a way that no dirt or dust can enter the conduit when the suction funnels are turned into their inoperative position, while the dust guard can at any time be turned into its operative position.

Figure 1:
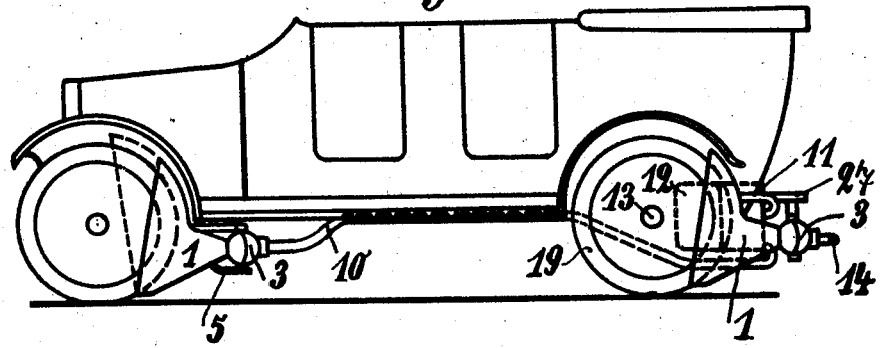
Figure 2:
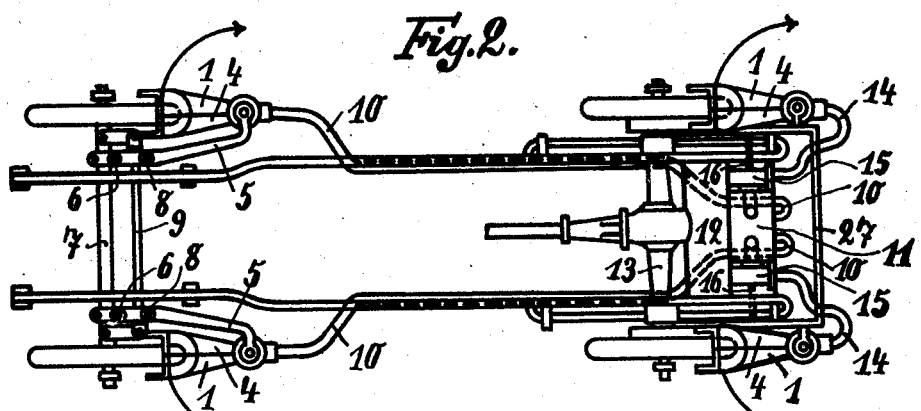
Figure 3:
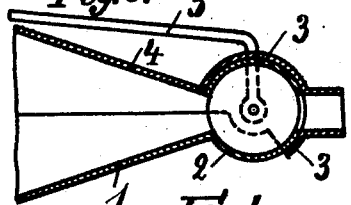
Figure 4:
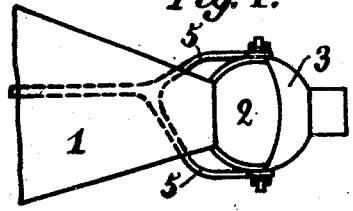
Figure 5:
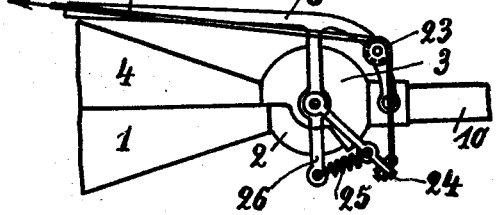
Figure 6:
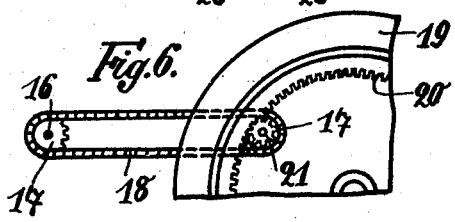

The accompanying drawing illustrates the improved arrangement: Fig. 1 is a side view of a motor car fitted therewith, Fig. 2 is a plan view of the chassis of the car, Fig. 3 is a longitudinal horizontal section through part of a suction funnel, Fig. 4 is a side view of said part, Fig. 5 is a plan view of a suction funnel with the mechanism for turning the same into its operative position, Fig. 6 is a side view of the driving-gear for the suction fans.

The suction funnels, preferably of light-metal, enclose the rear part of the road wheels of the motor car and are made in two parts (Fig. 2) in such a way that the outer part 1 can be turned away (in the direction of the arrows shown in Fig. 2) from the inner part 4 to cease the suction. Said outer part 1 of each suction funnel is provided with a ball head 2 which is mounted in a corresponding ball cup 3 (Fig. 3) of the stationary part 4 and adapted to turn therein; the ball head 2 being provided with a suction opening.

The ball head 2 and the cup 3 at the front wheels are carried by a fork 5 fulcrumed to bolts 6 of the front wheel axle 7 and adapted to be moved by means of pins 8 of the steering-bar 9, so that the front wheel suction funnels execute the same movements as the front wheels. The suction funnels are connected by flexible suction pipes 10 with the dust collector 11 located behind the fuel container 12 (Fig. 2).

The two suction funnels for the rear wheels are mounted on a frame 27 fixed to the rear wheel axle 13 so that the suction funnels participate in the springy movements of the rear wheels. Suction pipes 14 lead from the rear wheel suction funnels to the dust collector 11.

Suction is effected by means of two suction fans 15, the driving axles 16 of which are mounted in the frame 27 and which are driven by chain wheels 17 and chains 18 from the rear wheels 19 which for this purpose have an internal gear with which meshes a pinion 21 keyed on the axle of the corresponding chain wheel 17 which axle is also mounted in the frame 27, the driving-gear for the suction fans having thus a springy mounting like the wheels themselves. The driving-gear may be enclosed by a dust-tight casing.

The four outer suction funnel parts 1 are each connected by a wire cord 22 (Fig. 5) to a handle or treadle on the driver's seat, whereby they can be simultaneously turned into their operative (closed) or inoperative (open) position. Each wire cord 22 is guided over a roller 23 and connected with a one-armed lever 24 attached to the ball head 2, while a spring 25 intervening between said lever and an arm 26 of the fork 5 constantly acts to return said lever to its initial position.

What I claim, is:

1. A dust guard for motor cars, comprising a suction funnel enclosing the rear part of each road wheel of the car and consisting of two parts of which one is stationary and the other turnable in an outward direction, a ball cup on the stationary part, a ball head on the turnable part mounted in said ball cup and having a suction opening therein adapted to be closed when the turnable part is turned outwards.

2. In a dust guard as specified in claim 1, means to move the suction funnels at the front wheels of the car together with the wheels themselves.

3. In a dust guard as specified in claim 1, a dust collector, suction pipes attached to said suction funnels and leading into said dust collector, suction fans for said dust collector, and means to drive said fans from the rear wheels of the car.

In testimony whereof I have hereunto set my hand.

GUSTAV KLISCH.